United States Patent
Pisani

(10) Patent No.: US 10,021,764 B2
(45) Date of Patent: Jul. 10, 2018

(54) REMOTE AUDIOVISUAL COMMUNICATION SYSTEM BETWEEN TWO OR MORE USERS, LAMP WITH LIGHTS WITH LUMINOUS CHARACTERISTICS WHICH CAN VARY ACCORDING TO EXTERNAL INFORMATION SOURCES, SPECIFICALLY OF AUDIO TYPE, AND ASSOCIATED COMMUNICATION METHOD

(71) Applicants: Patrizio Pisani, Rome (IT); Lucia Pisani, Terni (IT)

(72) Inventor: Patrizio Pisani, Rome (IT)

(73) Assignees: Patrizio Pisani, Rome (IT); Lucia Pisani, Terni (IT)

( * ) Notice: Subject to any disclaimer, the term of this patent is extended or adjusted under 35 U.S.C. 154(b) by 0 days.

(21) Appl. No.: 15/324,098

(22) PCT Filed: Jun. 25, 2015

(86) PCT No.: PCT/IB2015/054786
§ 371 (c)(1),
(2) Date: Jan. 5, 2017

(87) PCT Pub. No.: WO2016/005848
PCT Pub. Date: Jan. 14, 2016

(65) Prior Publication Data
US 2017/0171946 A1    Jun. 15, 2017

(30) Foreign Application Priority Data
Jul. 7, 2014 (IT) .............................. RM2014A0363

(51) Int. Cl.
*H05B 37/02* (2006.01)
*A63J 17/00* (2006.01)
(Continued)

(52) U.S. Cl.
CPC ...... *H05B 37/0236* (2013.01); *G10L 15/1815* (2013.01); *G10L 15/22* (2013.01);
(Continued)

(58) Field of Classification Search
None
See application file for complete search history.

(56) References Cited

U.S. PATENT DOCUMENTS

| | | | |
|---|---|---|---|
| 2010/0071535 A1* | 3/2010 | McKinney | H05B 37/0236 84/464 R |
| 2014/0328484 A1* | 11/2014 | Molinie | H04L 12/282 381/2 |
| 2015/0002046 A1* | 1/2015 | Schlangen | H05B 37/0236 315/291 |

FOREIGN PATENT DOCUMENTS

| | | |
|---|---|---|
| WO | WO-2009/150592 A1 | 12/2009 |
| WO | WO-2012/098493 A1 | 7/2012 |
| WO | WO-2013/076606 A1 | 5/2013 |

OTHER PUBLICATIONS

International Search Report and Written Opinion for PCT/IB2015/054786, dated Sep. 18, 2015; ISA/EPO, Rijswijk.

\* cited by examiner

*Primary Examiner* — Dedei K Hammond
(74) *Attorney, Agent, or Firm* — Harness, Dickey & Pierce, PLC

(57) ABSTRACT

A lamp with lights with luminous characteristics which can vary according to external information sources, which comprises: at least one photoemitter device susceptible of producing a light radiation which can vary in intensity and color temperature, a data processing unit configured to drive the at least one photoemitter device, and means of interfacing with external information sources configured to transmit electrical/electronic audio data; and wherein the data processing
(Continued)

unit is configured to cause a variation of the color temperature and/or of the light radiation intensity of the at least one photoemitter device according to the electrical/electronic audio data retrieved according to a previously determined encoding; the lamp further comprising audio interface means susceptible of allowing the reproduction of the electrical/electronic audio data and/or the recording of the electrical/electronic audio data, in simultaneous association with the variation of the color temperature and/or of the light radiation intensity.

13 Claims, 1 Drawing Sheet

(51) Int. Cl.
     *H05B 33/08*         (2006.01)
     *G10L 15/22*         (2006.01)
     *G10L 15/18*         (2013.01)
     *F21V 14/02*         (2006.01)
     *G10L 25/63*         (2013.01)
     *G10L 25/72*         (2013.01)
(52) U.S. Cl.
     CPC ..... *H05B 33/0842* (2013.01); *H05B 37/0245* (2013.01); *G10L 25/63* (2013.01); *G10L 25/72* (2013.01)

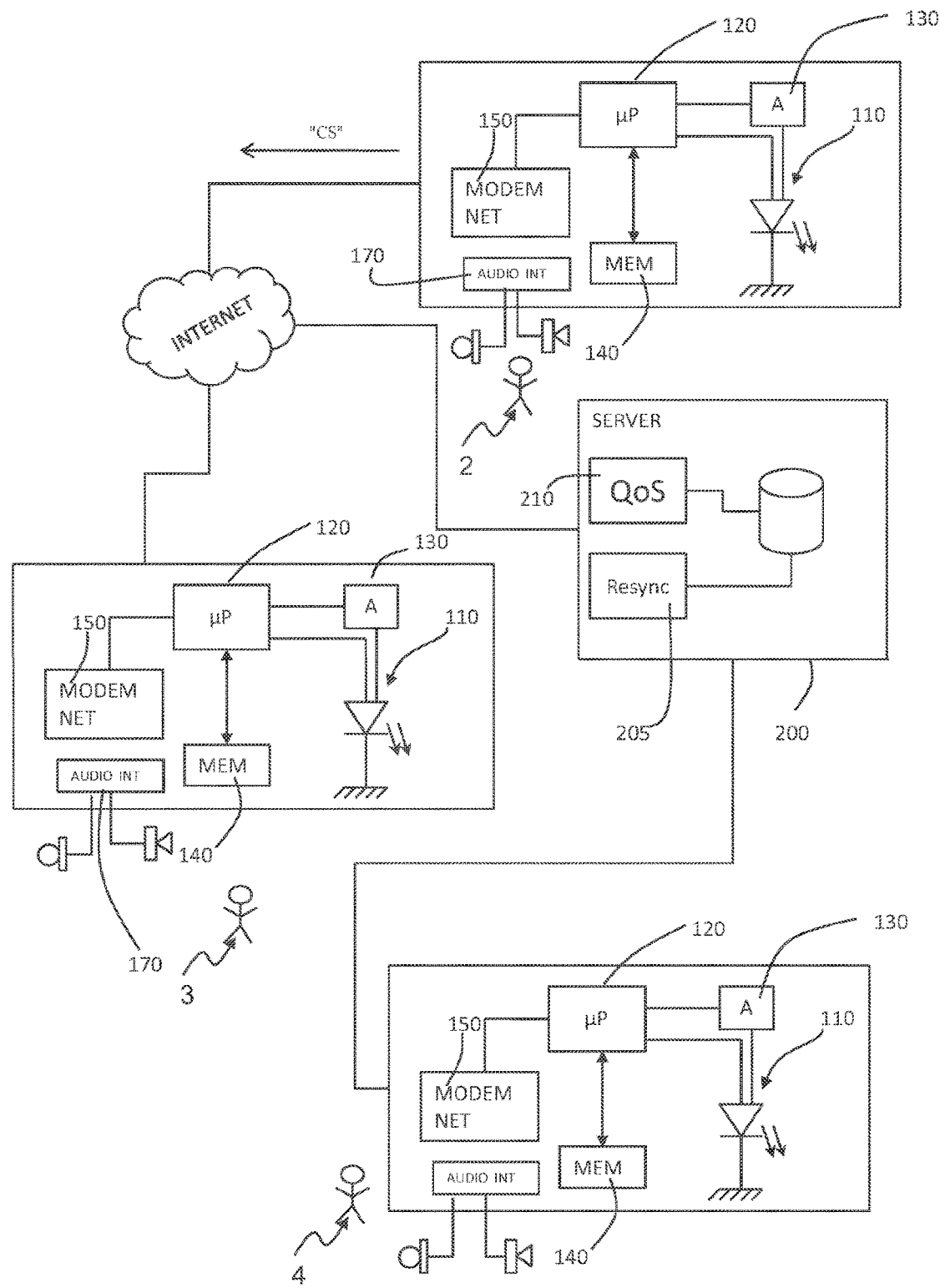

REMOTE AUDIOVISUAL COMMUNICATION SYSTEM BETWEEN TWO OR MORE USERS, LAMP WITH LIGHTS WITH LUMINOUS CHARACTERISTICS WHICH CAN VARY ACCORDING TO EXTERNAL INFORMATION SOURCES, SPECIFICALLY OF AUDIO TYPE, AND ASSOCIATED COMMUNICATION METHOD

CROSS-REFERENCE TO RELATED APPLICATIONS

This application is a 371 U.S. National Stage of International Application No. PCT/IB2015/054786, filed Jun. 25, 2015, which claims the benefit of and priority to Italian Patent Application No. RM2014A000363, filed Jul. 7, 2014. The entire disclosures of the above applications are incorporated herein by reference.

TECHNICAL FIELD

The present invention relates to systems for controlling lights.

In detail, the present invention relates to a remote audiovisual communication system between two or more users.

The present invention likewise relates to a lamp with lights with luminous characteristics which can vary according to external information sources.

The present invention furthermore relates to a method of communicating information by way of such lamp.

BACKGROUND ART

The use of lamps with variable luminous characteristics is known. In fact there are lamps which can be controlled by way of remote controls. Such lamps typically use LED photoemitters which can vary the color temperature of the light radiation emitted.

It is likewise known that humans associate certain types of color with different perceptions or psychological reactions. In this regard, a number of studies have shown that:

The color red, which is the most studied, stimulates excitement and evokes a situation of danger, such as for example fire. The color red can elicit psychological reactions of combat and rapid physiological effects: increase of blood pressure, adrenaline, and heartbeat. In other words, red is recognized as an alarm signal and is transmitted as such from generation to generation. Furthermore it has much more energy than other colors.

The color blue is the exact opposite of the color red, and is associated with serenity and tranquility. In blue in fact we see associations with the sky and with water. Other psychological studies have shown that humans associate blue with constancy and reliability. This explains why certain types of blue are often used in company logos to convey reliability.

The color green is instinctively associated with nature, which suggests sensations of freshness and cleanliness. It elicits sensations of cleanliness and calm, and together with blue it is for example used in hospitals.

Yellow represents the sun. Strong yellows elicit sensations that are more vivid and inviting, and this is why yellows attract our attention more. The color yellow is therefore a good choice for attracting attention.

Other psychological studies show that it is not just some colors which evoke particular sensations; so do particular combinations of those colors. Nowadays combinations of colors like yellow and black remind us of predatory animals and stinging insects. The highly attractive nature of this combination of colors always remains in our minds.

The color orange is a combination of red and yellow, and adopts characteristics of both, mixing the excitement of red and the warm, vivid sensations of yellow. Orange has a wide spectrum of shades, and transmits energy. Owing to its energy, orange is often associated with festivities, and is therefore a good choice for a design celebrating festive or popular events.

The color brown can for example be associated with the color of dark wood, giving humans a sensation of wellness and peace, indeed evoking the sensuality of wood.

The color purple is a mixture of red and blue, and is the most complex of the colors. The red makes purple warmer, and brings out the sensuality of its shades, while the blue cools it, thus making it calmer and more tranquil. The link between purple and royalty goes back hundreds of years in European nobility.

Over and beyond the psychological aspect, in modern, technology-oriented life colors like red and green are automatically associated with stop and go signals, owing to the wide diffusion of traffic lights, and they also signal a malfunction or danger or a correct operation. The psychological effect of colors has thus made the transition to technology, and even though at times we may not be directly aware of it, in computer software and in everyday electronic apparatuses, or the dashboard of an automobile, red signals, in particular if associated with strong or intermittent light, indicate problems with use or malfunctions, and put us instinctively on our guard, while green or blue signals indicate a correct operation.

The applicant has thus substantially found that light is capable of transmitting emotional images in a substantially simple manner.

The applicant has furthermore found that for example in a prayer, a priest leads a plurality of faithful by way of his voice. The remote transmission of a prayer nowadays occurs by shooting a Mass by way of one or more video cameras and transmitting, to the remote user, a mixed audio/video data flow which has the drawback of a large bandwidth.

The applicant has found that this can be problematic where the need for bandwidth is a significant problem, or such bandwidth is subject to an appreciably high payment.

Furthermore the applicant has observed that today no medium exists for sharing a prayer between a plurality of remotely-located users which elicits emotions and associations without necessarily transmitting images.

Although the specific example of a prayer has been cited, the foregoing can also apply to any application in which there is a requirement to associate an audio data flow with an emotional transmission, such as for example for songs.

The aim of the present invention is thus to reduce the drawbacks described above. In particular an object of the present invention is to increase ecstatic/emotional experience by way of synchronized light.

SUMMARY OF THE INVENTION

According to the present invention, a remote audiovisual communication system between two or more users is provided, such system comprising:
at least a first lamp and a second lamp with lights with luminous characteristics which can vary according to external information sources, each one comprising: at least one photoemitter device susceptible of producing a light radiation which can vary in intensity and color temperature, a data processing unit configured to drive the said at least one photoemitter device, audio interface means configured to allow an electrical/electronic audio data stream between at least a first user and a second user; and means of interfacing with external information sources, configured to allow the reception and/or the transmission of said electrical/electronic audio data from a remote information source; said data processing unit being configured to cause a variation of said color temperature and/or of said light radiation intensity according to said remotely retrieved electrical/electronic audio data, according to a predetermined color temperature and/or light radiation intensity encoding based on said electrical/electronic audio data.

Advantageously, the audio interface means comprise at least one microphone and a loudspeaker which are respectively positioned at least at said first and said second lamp.

Advantageously, said first lamp is a first lamp of a first, master type and said second lamp is a second lamp of a second, slave type, and wherein said first lamp is configured to transmit said electrical/electronic audio data to said second lamp.

Advantageously, said external information source is said first lamp or said second lamp.

Advantageously, said system further comprises a central server to which said first and/or said second lamp transmit and/or receive said electrical/electronic audio data, and wherein said external information source is said central server.

Advantageously, said encoding is performed on the basis of a vocal semantic digital processing of an audio signal received by said audio interface means, said vocal semantic digital processing being performed by a data processing unit of said first and/or said second lamp.

Advantageously, said encoding is performed on the basis of a semantic analysis of an audio signal received by said audio interface means and/or on the basis of a semantic analysis of an electronic text which was previously stored by said first lamp, wherein said text reproducing in written form said audio signal received by said audio interface means.

According to the present invention, a lamp with lights with luminous characteristics which can vary according to external information sources is also provided, which comprises: at least one photoemitter device susceptible of producing a light radiation which can vary in intensity and color temperature, a data processing unit configured to drive said at least one photoemitter device, and means of interfacing with external information sources configured to transmit electrical/electronic audio data; said lamp comprising a data processing unit configured to cause a variation of said color temperature and/or of said light radiation intensity of said at least one photoemitter device according to said electrical/electronic audio data retrieved according to a previously determined encoding; said lamp further comprising audio interface means susceptible of allowing the reproduction of said electrical/electronic audio data and/or the recording of said electrical/electronic audio data, in simultaneous association with said variation of the color temperature and/or of said light radiation intensity.

Advantageously, said predetermined encoding is set according to a semantic and/or vocal analysis of said electrical/electronic audio data.

Advantageously, said data processing unit is configured to perform said encoding according to said semantic analysis and secondarily to the speed of speech.

Advantageously, said interface means are configured to transmit, to a further lamp or to a central server system, both said electrical/electronic audio data and a luminous encoding signal susceptible of causing a variation of luminous characteristics of another lamp according to said encoding, so as to be able to receive said audio data and said luminous encoding signal in synchronous mode.

According to the present invention, a method of transmission of an emotional signal associated with a speech to a user in a remote position with respect to the speaker is also described, said method comprising:

- a step of acquisition of an audio signal through audio interface means of a lamp with lights with luminous characteristics which can vary according to external information sources;
- a step of encoding said audio signal through a data processing unit of said lamp susceptible of producing as output a signal to command at least one photoemitter device of said lamp or of another lamp which is electrically connected thereto, wherein said command signal drives said photoemitter by varying its light radiation intensity and/or its color temperature according to a vocal and/or semantic analysis of said audio signal;
- a step of transmission of said command signal to said further lamp or to a central server device together with electrical/electronic audio data corresponding to a digitalization of said audio signal;
- a step of reception of said command signal of said electrical/electronic audio data by said further lamp;

Advantageously, said method comprises a step of transmission of said electrical/electronic audio data corresponding to a digitalization of said audio signal together with said command signal, and further comprises a step of reproduction of said electrical/electronic audio signal by way of audio interface means of said further lamp 100 in association with a step of modification of the luminous characteristics of said further lamp in synchronous association with said electrical/electronic audio signal reproduced on the basis of said received command signal.

Advantageously, said method comprises a step of prior storage of a text corresponding to said audio signal, and wherein said step of encoding comprises a step of textual semantic analysis of said stored text and a step of combination of said textual semantic analysis with said vocal analysis and/or speed of speech.

Advantageously, said method comprises a step of electronic connection of said lamp and of said further lamp to said central server system before said transmission of said electrical/electronic audio data or, alternatively, a step of direct electronic connection of said lamp with said further lamp before said transmission of said electrical/electronic audio data.

Advantageously, before said direct connection or said connection to said server system a step of verification of a unique code of said lamp and/or of said further lamp is performed in order to verify a criterion of eligibility for the connection.

Advantageously, said method is characterized in that it has at least one lamp in a first, master configuration susceptible of sending both said audio data and said command signal and at least one lamp is in a slave configuration, receiving said command signal from said lamp in the master configuration and a plurality of audio data from other lamps in the slave configuration.

DESCRIPTION OF THE FIGURES

The invention will be described hereinbelow in a preferred, but non-limiting embodiment thereof and with reference to the accompanying drawings wherein:

FIG. 1 is a conceptual block diagram of a remote audio-visual communication system between two or more users by way of lamps which are remotely connected and have characteristics of brightness which can vary in intensity and in color temperature.

DETAILED DESCRIPTION OF THE INVENTION

With the reference numeral 100 a preferred and non-limiting embodiment is generally designated of a lamp with lights with luminous characteristics which can vary according to external information sources. Said lamp comprises: at least one photoemitter device 110, preferably of the LED type, which is susceptible of producing a light radiation which can vary in intensity and color temperature. In other words, the LED can be driven so as to vary the brightness and color of the light emitted.

The lamp 100 in the present invention further comprises a data processing unit 120, which is configured to drive the at least one photoemitter device 110 so as to make it vary its brightness and color temperature according to a predetermined criterion which will be better described below.

Furthermore, the lamp in the present invention further comprises a power module 130 which provides a means of power for at least the data processing unit and the at least one photoemitter device. Preferably such power module 130 is configured to power said lamp by transforming an alternating voltage, typically supplied at 220V on its inputs, to a direct voltage of lower value, which is produced on its outputs powering both the data processing unit and the at least one photoemitter device.

Furthermore, the lamp in the present invention comprises a memory 140, which is electrically connected to the data processing unit 120; on such memory is stored a plurality of information items which comprise for example the predetermined criterion with which the photoemitter device is to change light intensity and/or color temperature, or even one or more addresses of devices and/or portals which are remotely positioned with respect to the lamp and through which it is possible to retrieve information data by virtue of which the lamp causes the change of color temperature and/or light intensity of the radiation emitted by the photoemitter device 110.

In fact, the lamp in the present invention comprises means of interfacing 150 with external information sources 160, which have at least one first terminal electrically connected to the data processing unit 120 for the transmission of information data to said data processing unit and means of acquisition of said information data from a remote information source; in substance the means of interfacing comprise for the purposes of non-limiting example a modem, a network interface or even a wireless interface of the Wi-Fi type for example. Thanks to the means of interfacing 150 with external information sources 160 the lamp in the present invention is capable of presenting the user 2-4 with a plurality of heterogeneous data by encoding such data in an extremely simple manner, and specifically through a luminous encoding of varying brightness and/or color temperature according to a predetermined criterion.

In particular the data is audio data, which is transmitted to the user 2-4 since the lamp 100 comprises audio interface means 170, which are configured to allow the reception and the transmission of a physical audio signal, which is emitted preferably but not exclusively by the user by way of speech, and is retransmitted to the other user In detail, the audio interface means 170 comprise a microphone and a loudspeaker or, alternatively, an audio connection socket susceptible of allowing the reproduction of the audio signal on a stereo system.

Furthermore the data processing unit 120 is capable of performing a vocal analysis of the audio signal emitted by a user, which is obviously encoded prior to such vocal analysis by conventional analog-to-digital conversion means of known type in order to be converted to digital electric audio data which is then processed. In detail the data processing unit 120 is capable of analyzing mainly the words and their speed and, secondly, tone, instantaneous voice intensity and/or average voice intensity, and of analyzing the formats of the voice, the type of the voice and more generally all the known aspects of vocal semantic analysis in order to produce on an output thereof a command signal "cs" which is capable of commanding the at least one photoemitter device so as to enable the variation of its light radiation intensity and of its color temperature according to the characteristics of the audio signal. Preferably, the encoding is performed so as to make the photoemitter device take on more brilliant colors, characterized by a greater light radiation intensity, when determined words are detected (for example: "our Father", or "glory be to God"), and, consistently, to reduce its light radiation intensity when the words are detected which are of less important significance in the context of the prayer.

Furthermore, the control of the variation of light intensity is determined by the speed of the words that the user utters, advantageously also making it possible to achieve, at a remote location, an evocative effect not only of the words in the context of the prayer, but also of their speed of utterance.

Optionally, text files can also be stored in the memory. Such text files mainly reproduce the audio signal that is sent to the audio interface means. This is advantageously useful since the data processing unit can in such case also be configured to perform, alternatively to or in combination with the vocal analysis, a semantic analysis of the text file so as to be able to produce as output a command signal "cs" which is capable of commanding the at least one photoemitter device so as to enable the variation of its light radiation intensity and of its color temperature according to the text file or, if both the vocal analysis and the semantic analysis of the text are performed simultaneously, according to the content of the text file and according to the audio signal received. This enables a more exact analysis, and makes it possible to identify the keywords that cause the generation of particular types of light radiation even if they vary over time, such as for example a sinusoidal variation of the light radiation intensity associated with a sudden change of color from red to blue. The text files are, specifically, loaded into memory by way of a conventional connection port, for example USB, or through a wireless connection. Advantageously, such port for connection to the electronic computer of the user is configured in such a way as to present the latter with a device of the "plug and play" type, so as to facilitate the use of the lamp for non-expert users as well. It is likewise possible for the lamp 100 in the present invention to have, already contained in the memory 140, a plurality of text files stored in advance prior to sale or in any case before delivery to the user.

As a consequence, thus, words-prayers-sequences encoding data is stored in the memory of the lamp 100, and can be either directly loaded into memory, or acquired by the lamp through the connection with the server.

For example, this therefore makes it possible, for a prayer, for white light to be emitted for the "Our Father" prayer, or a red-toned light for the "Hail Mary" prayer, or even a yellow-toned light for the "Glory be to the Father" prayer.

Furthermore, the data processing unit 120 samples the audio and by way of the ASR unit (local or cloud-based) associates a time marking (word sequence stamp) of the key words of the electrical/electronic audio data received. The time distances between keywords make it possible to also estimate the speed of the prayer. With this information, as mentioned above, the lights are synchronized (in their effects and colors). The effects and the colors can also be selected manually by the master (it can associate a tone with the different prayers and effects to change the color temperature or intensity during the recitation of a prayer).

The speech recognition system is facilitated by the fact that it knows the prayer that is to be recited and the sequence of words (it thus has a reduced search space).

This is useful because the lamp 100 in the present invention is configured to send the command signal "cs" together with the digital audio data to another lamp 100 which is configured to receive the foregoing through the means of interfacing 150 towards remote information sources. According to the various types of connection which can be provided, the digital audio data will be electrical or electronic data (in this latter case for example it will be contained in packets susceptible to be transmitted on a data communication internet network).

Specifically, the connection between two or more lamps can occur through a connection of the point-to-point or point-to-multipoint type, in which the remote information source is directly a lamp 100, or even through a connection with interposition of a central server 200, which in this case acts as the direct remote information source, even though the original signal comes from a lamp 100.

Since every lamp 100 comprises audio interface means susceptible of allowing both the transmission and the reception of audio signals, in a remote audiovisual communication system between two or more users like the one shown in the accompanying figures it is possible to configure a first lamp 100 as a master lamp and a second lamp 100 as a slave lamp. The "master" lamp is the one that sends both the audio data and the command to control the luminous characteristics to the other lamps of the system. The slave lamps receive the audio data originating at least from the master lamp, but optionally also from other slave lamps. The system described in the present invention therefore makes it possible for example, but not exclusively, to transmit a Mass. The same can be said for reciting a rosary, or for other, similar prayers in use in other religions beside Catholicism. Such prayers can therefore be transmitted to a plurality of users who are located remotely from a priest who will be provided with a lamp 100 in the master configuration (the users will have the lamp configured in slave mode). The master configuration makes it possible to receive, through the microphone, an audio signal (in this case the speech of the priest), while the slave configuration makes it possible to transmit what is received through the loudspeaker. The user not only is capable of receiving the Mass remotely, but also has a luminous "guide" to the repetition of the prayer, which helps him or her to pronounce the stages according to a luminous indication which is known per se to produce sensations of voice volume increase with the increase of the color temperature and/or of the brightness of the photoemitter device on the slave lamp 100.

Preferably, each lamp is associated with a unique code which is stored on the central server 200 when the lamp is first introduced into the system, and which makes it possible to manage which users (i.e., which lamps 100) can be configured to receive the electrical/electronic audio data flow from the master lamp 100 together with the command signal "cs". This, if the system is of the paid type, advantageously makes it possible to be able to include or exclude determined users in/from the transmission of the data flow in a centralized manner.

From the technical point of view, the connection of each lamp 100 with a further lamp or through the central server can occur by way of Wi-Fi, Bluetooth, or by way of a wireless personal area network standard (ZigBee, Zwave). In particular, the central server 160 can be a personal area network gateway (for example ZigBee, Zwave or Bluetooth) or a PC or a telephone (for example by way of Bluetooth). The operation of the connection preferably and not exclusively is based on the use of APIs and publish-subscribe protocols (e.g.: MQTT, OpenDDS). In detail, publish-subscribe protocols like MQTT advantageously enable a user to publish on a network and a plurality of further users to subscribe to the publication if they are permitted to do so. Such protocols are therefore optimal for the transfer of the command signal "cs" together with the electrical/electronic audio data flow.

The set-up sequence of a prayer could be the following: the proponent, who is represented by the master user 3 (for example, the priest or the singer) and who is provided with a lamp 100 in the master configuration, publishes the offer (his or her API publishes the service) on a portal or on the central server 200, and anyone who is interested signs up (his or her API is made available for the event). The signed-up users, who are therefore provided with lamps in the slave configuration, are schematically indicated in FIG. 1 with the reference numeral 3, 4.

The cloud system keeps account of the related information (how many there are, from how many countries etc.). The information (on the progression of the prayer and on the color of the phases), is transmitted by the coordinator and received by the user who has signed up.

The APIs of receiving users can reside either on the gateway (which uses an agent to translate the protocol for the lights and the local telephones/tablets), or directly on the telephones/tablets (which by way of Bluetooth or Wi-Fi also control the lamps), or independently on both the lamp and on the telephone.

Management of the services and of the APIs is entrusted to an API manager in the cloud, which also takes care of interfacing each lamp with the correct version of the prayer and with the correct language, which are stored in advance.

Technically, therefore, when the lamp 100 prepares to send the data flow described above, if it is a communication over a network, preferably the internet, it encapsulates the data in packets: the sampled voice marked with the sequence stamps associated with the keywords, the information about speed and the luminous performance (command signal "cs"). The sequence of generated packets is then distributed on the network.

Optionally the system in the present invention can be provided with a method of verifying the QoS (Quality of Service) with which it verifies that there is sufficient bandwidth and acknowledgement of the correct time sequence of the packets of electrical/electronic audio data by way of a stage of re-synchronization 205 of packets which can be advantageously provided either in hardware or, alternatively or in combination, in software, so as to make it possible to begin the transmission only if the quality is sufficient. Such method can be ideally provided by way of a stage of verification of quality of service 210, which is present on the server 200. The stage of verification of quality of service 210 thus makes it possible to select the activation of the communication only on sources that guarantee sufficient quality and which can be synchronized in order to be able to send the audio data and the command signal "cs" to other users.

Advantageously, the quality of service verification stage optionally also checks the sequence of the words received from the user and which are to be retransmitted to the other lamps, making it possible to interrupt the communication or to "cut" the audio on words considered unsuitable which are stored in advance, such as for example blasphemous words or even incorrect prayers.

The quality of service verification stage thus acts as a semantic filter which is capable of selecting parts of the audio data which should be cut and excluded from the retransmission to the destination users.

If it is made necessary by the infrastructural communication characteristics of the system in the present invention, the audio data transmitted between the lamps 100 and/or the server 200 can advantageously be encoded by way of compression techniques of the lossless or lossy type, which are chosen on the basis of the specifications of the user and which make it possible to maintain at least the total intelligibility of the speech. Clearly, the compression will be less extreme where the audio data includes musical data, and can be adapted according to a quality of service return signal, which is retransmitted by the quality of service control stage 210 on the server 200 to each one of the lamps 100 in the present invention, each one of which in such case comprises preferably but not exclusively an audio encoding/decoding stage of the adaptive type. This advantageously makes it possible to overcome the bandwidth limitations which may arise on the network for example if the bandwidth connection is made by way of mobile radio devices such as cellular phones.

Finally, although in the present description reference has been made to a single master lamp, configurations will clearly be possible in which two lamps configured as masters actively transmit an electrical/electronic audio data flow to a lamp configured as a slave, mixing the received audio flows automatically managed by the data processing unit or alternatively by way of a manual control command of the user.

To sum up, then, when the slave user 4 decides to listen remotely for example to a Mass or a rosary, he or she connects the lamp 100 in his or her possession to the data communication network, preferably at a pre-established time. The lamp is then identified in the communication system together with other lamps in the "slave" configuration, and which are capable of receiving the command signal "cs" together with the audio data. When the priest is ready to recite the Mass, by starting to speak and optionally having selected the appropriate text file associated with the prayer or part of the Mass that he intends to recite, he will cause the transmission of the electrical/electronic audio data together with the command signal to the lamps 100 in the present invention which had previously been associated with his lamp 100 in the master configuration, either with a direct communication or through the system server 200, in this case the latter managing the routing of the command signals and of the electrical/electronic data selectively for a subset of the lamps of the system in the present invention.

The advantages of the system in the present invention are clear in light of the foregoing description. In fact it makes it possible to transmit for example prayers between remote users, or audio tracks, thus making it possible not only to remotely receive the audio, but also to have a luminous representation synchronous with the audio which can evoke sensations associated with the transmitted audio and can guide the end user/recipient respectively in the repetition of the prayer or in the singing of the song.

The fact of transmitting only an audio signal in synchronous association with a command signal for one or more photoemitters makes it possible to transmit ecstatic emotional patterns correlated with a speech such as prayer by being able to synchronize these patterns with recipient users, even if remotely located, and moreover leaving the possibility open that these users can also hear the voices of other recipient users, precisely because each lamp is provided with both microphone and audio output.

With reference to for example the Mass or the rosary imparted by way of the system in the present invention, being able to hear both the voice of the priest and those of the other users receiving the Mass or responding to the rosary advantageously makes it possible to have a greater emotional involvement, making the end user remotely experience substantially the same ecstatic-emotional experience that he or she could have if everyone were present in the same place.

Therefore—both in the first embodiment, in which the lamps are connected with point-to-point connections or point-to-multipoint connections, and in the second embodiment, in which the lamps are connected with a connection via server—it is possible to manage a connection between a great number of lamps without necessitating significant information technology structures to handle a huge quantity of data in transit. This translates to a corresponding saving in infrastructural investments, at least in the main stages of development of the invention.

The lamp in the present invention can, depending on the individual case, simply be configured as a master or as a slave, but it enables both the recording of the audio signal and its reproduction in the form of real-time streaming between remote users. Furthermore, the fact that the audio encoding is performed directly in the lamp makes it possible to maintain the information technology structure of the server to a minimum, which therefore can be substantially totally dedicated to managing the data flows. However, the audio encoding can likewise be performed at server level, rendering the lamp in the present invention less expensive.

In the master-slave configuration described above, the user associated with the master lamp also has the ability to see, in real time, what is happening at the luminous level on the remotely-located lamps, since he is provided with a lamp like all the others. This advantageously helps, in the case described above, for example the priest in reciting the prayer.

Although in the embodiment described herein up to now of the system reference has been made to a master-slave solution that makes it possible to obtain the transmission of the audio data and of the "cs" command to the slave lamps of the system, the most basic embodiment of the system can also comprise only the sending of the command "cs".

Finally, it is clear that the system and to the lamp in the present invention can be subjected to additions, modifications or variations which are obvious to a person skilled in the art but without for this reason leaving the scope of protection provided by the appended claims.

The invention claimed is:

1. A remote audiovisual communication system between two or more users, said system comprising:
  at least a first lamp and a second lamp with lights with luminous characteristics which can vary according to external information sources, each one comprising:

at least one photoemitter device susceptible of producing a light radiation which can vary in intensity and color temperature, a data processing unit configured to drive the said at least one photoemitter device, audio interface means configured to allow an electrical/electronic audio data stream between at least a first user and a second user; and means of interfacing with external information sources, configured to allow reception and/or transmission of said electrical/electronic audio data from a remote information source;

wherein said data processing unit being configured to cause a variation of said color temperature and/or of said light radiation intensity according to said remotely retrieved electrical/electronic audio data, according to a predetermined color temperature and/or light radiation intensity encoding based on said electrical/electronic audio data, and said audio interface means being further configured to allow the reproduction of said electrical/electronic audio data and/or recording of said electrical/electronic audio data, in simultaneous association with said variation of color temperature and/or of said light radiation intensity; and a central server connected to and to which said first lamp and/or said second lamp transmits and/or receives said electrical/electronic audio data, wherein said external information source is said central server, and wherein the first lamp and/or second lamp is electronically connected before transmission of said electrical/electronic audio data from the remote information source, and before said first lamp and/or said second lamp transmits and/or receives said electrical/electronic audio data, a unique code of said first lamp and/or second lamp is verified by the central server to confirm eligibility for said connection.

2. The system according to claim 1, wherein said audio interface means comprises at least one microphone and one loudspeaker which are respectively positioned at least at said first and said second lamp.

3. The system according to claim 1, wherein said first lamp is a first lamp of a first, master type and the second lamp is a second lamp of a second, slave type, and wherein said first lamp is configured to transmit said electrical/electronic audio data to said second lamp, of which the light radiation intensity and color temperature of said at least one photoemitter device are driven by said master lamp.

4. The system according to claim 1, wherein said external information source is said first lamp or said second lamp.

5. The system according to claim 1, wherein said encoding is performed on the basis of a vocal semantic digital processing of an audio signal received by said audio interface means, said vocal semantic digital processing being performed by a data processing unit of said first and/or said second lamp.

6. The system according to claim 1, wherein said encoding is performed on the basis of a semantic analysis of an audio signal received by said audio interface means and/or on the basis of a semantic analysis of an electronic text which was previously stored by said first lamp in a respective memory thereof, wherein said text reproduces in written form said audio signal received by said audio interface means.

7. A lamp with lights with luminous characteristics which can vary according to external information sources, which comprises:

at least one photoemitter device susceptible of producing a light radiation which can vary in intensity and color temperature; and a data processing unit configured to drive said at least one photoemitter device, and means of interfacing with external information sources configured to transmit electrical/electronic audio data, wherein said data processing unit is configured to cause a variation of said color temperature and/or of said light radiation intensity of said at least one photoemitter device according to said electrical/electronic audio data retrieved according to a previously determined encoding;

said lamp further comprises audio interface means susceptible of allowing the reproduction of said electrical/electronic audio data and/or the recording of said electrical/electronic audio data, in simultaneous association with said variation of color temperature and/or of said light radiation intensity;

said interface means is configured to transmit to a further lamp or to a central server system both said electrical/electronic audio data and a luminous encoding signal susceptible of causing a variation of luminous characteristics of another lamp according to said encoding, so as to be able to receive said audio data and said luminous encoding signal in synchronous mode; and text corresponding to said audio signal is stored in a memory of said lamp, and said encoding comprises a step of textual semantic analysis of stored text and a step of combination of said textual semantic analysis with said vocal analysis and/or vocal semantic analysis and/or speed of speech.

8. The lamp according to claim 7, wherein said predetermined encoding is set according to a semantic and/or vocal analysis of said electrical/electronic audio data.

9. The lamp according to claim 7, wherein said data processing unit is configured to perform said encoding according to said semantic analysis and secondarily to the speed of speech.

10. A method of transmission of an emotional signal associated with a speech to a user in a remote position with respect to a speaker, said method comprising:

a step of acquisition of an audio signal through audio interface means of a lamp having lights with luminous characteristics which can vary according to external information sources;

a step of encoding said audio signal through a data processing unit of said lamp susceptible of producing as output a signal to command at least one photoemitter device of said lamp or of another lamp which is electrically connected thereto, wherein said command signal drives said photoemitter by varying its light radiation intensity and/or its color temperature according to a vocal and/or semantic analysis of said audio signal;

a step of transmission of said command signal to said further lamp or to a central server device together with electrical/electronic audio data corresponding to a digitalization of said audio signal;

a step of reception of said command signal of said electrical/electronic audio data by said further lamp;

a step of reproduction of said electrical/electronic audio signal by way of audio interface means of said further lamp in association with a step of modification of the luminous characteristics of said further lamp in synchronous association with said electrical/electronic audio signal reproduced on the basis of said received command signal; and a step of prior storage of a text corresponding to said audio signal in a memory of said lamp, and wherein said step of encoding comprises a step of textual semantic analysis of said stored text and a step of combination of said textual semantic analysis with said vocal analysis and/or vocal semantic analysis and/or speed of speech.

11. The method according to claim 10, wherein it comprises a step of electronic connection of said lamp and of said further lamp to said central server system before said transmission of said electrical/electronic audio data or, alternatively, a step of direct electronic connection of said lamp with said further lamp before said transmission of said electrical/electronic audio data.

12. The method according to claim 11, wherein before said direct connection or said connection to said central server system a step of verification of a unique code of said lamp and/or of said further lamp is performed in order to verify a criterion of eligibility for the connection.

13. The method according to claim 10, comprising configuring at least two lamps in a system of communication through light variations, wherein at least one lamp is in a first, master configuration susceptible of sending both said audio data and said command signal and at least one lamp is in a slave configuration, receiving said command signal from said lamp in the master configuration and a plurality of audio data from other lamps in the slave configuration.

* * * * *